US009219733B2

(12) United States Patent
Brewer et al.

(10) Patent No.: US 9,219,733 B2
(45) Date of Patent: Dec. 22, 2015

(54) SOFTWARE-BASED ALIASING FOR ACCESSING MULTIPLE SHARED RESOURCES ON A SINGLE REMOTE HOST

(75) Inventors: Jason Brewer, Kirkland, WA (US); Neeraj Garg, Redmond, WA (US); Gavarraju Nanduri, Bellevue, WA (US); Vikram Kakumani, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1180 days.

(21) Appl. No.: 12/165,495

(22) Filed: Jun. 30, 2008

(65) Prior Publication Data
US 2009/0327502 A1 Dec. 31, 2009

(51) Int. Cl.
*G06F 15/16* (2006.01)
*H04L 29/06* (2006.01)
*H04L 29/08* (2006.01)

(52) U.S. Cl.
CPC ............... *H04L 63/10* (2013.01); *H04L 67/14* (2013.01); *H04L 67/146* (2013.01)
USPC ........... 709/229; 709/203; 709/219; 719/328; 719/330

(58) Field of Classification Search
CPC ..... H04L 67/14; H04L 63/10; H04L 29/0809; H04L 29/08117; H04L 29/08072; H04L 67/146; G06Q 30/02
USPC .......................................................... 709/229
See application file for complete search history.

(56) References Cited

U.S. PATENT DOCUMENTS

| | | | |
|---|---|---|---|
| 4,718,005 A | 1/1988 | Feigenbaum et al. | |
| 5,276,879 A * | 1/1994 | Barry et al. | 718/106 |
| 5,388,213 A | 2/1995 | Oppenheimer et al. | |
| 5,530,703 A * | 6/1996 | Liu et al. | 370/255 |
| 5,826,027 A * | 10/1998 | Pedersen et al. | 709/221 |
| 5,881,269 A * | 3/1999 | Dobbelstein | 703/21 |
| 6,216,162 B1 | 4/2001 | Dutcher et al. | |
| 6,247,057 B1 * | 6/2001 | Barrera, III | 709/229 |
| 6,324,492 B1 * | 11/2001 | Rowe | 703/13 |
| 6,324,581 B1 * | 11/2001 | Xu et al. | 709/229 |

(Continued)

OTHER PUBLICATIONS

Kondor, "Desktop Heap Overview from blogs.msdn.com/ntdebugging/", Nov. 9, 2007, http://condorsci.blogspot.com/2007/11/desktop-heap-overview-from.html, last accessed Jul. 14, 2010.*

(Continued)

*Primary Examiner* — Tauqir Hussain
(74) *Attorney, Agent, or Firm* — Kate Drakos; Micky Minhas

(57) ABSTRACT

In order to allow a single user registered on a single local host or other machine to access multiple shared resources on a remote host, an aliasing mechanism is employed so that multiple concurrent connections can be established by the user to a single remote host, with each connection using a different identity. Each connection can therefore be used to access a different shared resource on the remote host. In some illustrative examples, a user's identifier such as his or her machine log-in identification may be associated with two or more resource sharing aliases. As a result, two or more resource sharing sessions can be established by the user with a single remote host, with each of the sessions using a different one of the aliases. The resource sharing sessions are usually established in accordance with a resource sharing protocol such as the Server Block Message (SBM) protocol.

13 Claims, 3 Drawing Sheets

(56) References Cited

U.S. PATENT DOCUMENTS

| | | | |
|---|---|---|---|
| 6,330,602 | B1 | 12/2001 | Law et al. |
| 6,453,354 | B1* | 9/2002 | Jiang et al. .................... 709/229 |
| 6,665,721 | B1 | 12/2003 | Hind et al. |
| 6,807,579 | B1* | 10/2004 | Frazier .......................... 709/245 |
| 6,807,666 | B1* | 10/2004 | Evans et al. ................... 718/108 |
| 7,177,642 | B2* | 2/2007 | Sanchez Herrero et al. .......................... 455/435.1 |
| 2005/0066202 | A1* | 3/2005 | Evans et al. ................... 713/202 |
| 2005/0089048 | A1* | 4/2005 | Chittenden et al. ...... 370/395.54 |
| 2005/0108407 | A1 | 5/2005 | Johnson et al. |
| 2005/0125532 | A1 | 6/2005 | Kimchi |
| 2005/0138152 | A1 | 6/2005 | Kruse |
| 2005/0278459 | A1* | 12/2005 | Boucher et al. ............... 709/250 |
| 2006/0031489 | A1 | 2/2006 | Marcjan |
| 2007/0157288 | A1* | 7/2007 | Lim .................................. 726/1 |
| 2007/0171921 | A1* | 7/2007 | Wookey et al. ................ 370/401 |
| 2008/0209050 | A1* | 8/2008 | Li .................................... 709/227 |
| 2008/0282337 | A1* | 11/2008 | Crawford ......................... 726/12 |
| 2008/0320145 | A1* | 12/2008 | Rivera ........................... 709/227 |

OTHER PUBLICATIONS

MacPherson, Luke, "IP Spoofing and Aliasing for the BSD TCP/IP Stack", Dec. 14, 2001, 41 pages.

Tzagarakis et al., "Naming as a Fundamental Concept of Open Hypermedia Systems", Hypertext 2000, San Antonio, TX, pp. 103-112.

* cited by examiner

SOFTWARE-BASED ALIASING FOR ACCESSING MULTIPLE SHARED RESOURCES ON A SINGLE REMOTE HOST

BACKGROUND OF THE INVENTION

Shared resources are commonly employed in computing environments. The proliferation of networked computers and increased processor speeds in the workplace, at home and over the Internet have increased the need by users on a computer network to concurrently access shared resources. For instance, printer sharing (shared printer access), file sharing (shared access to files), port sharing (shared access to serial ports) and the like allow multiple users to remotely access a resource such as a printer or file that is located on a remote host. File sharing, for instance, is one way in which users of computers may share resources, such as documents, software programs, and the like, with other computer users on a network. Generally, a user of a host computer, server, or other computing device designates some or all of the files on the computing device as shared files, which may be viewed and downloaded by other users of the network.

Various application level protocols are available to implement resource sharing including the Server Message Block (SMB) protocol, which is typically employed in a Windows™ environment, the Network File System (NFS), which is typically employed in a Unix environment, and the NetWare Core Protocol (NCP), which is typically employed in a Novell NetWare environment.

SMB, which is also sometimes referred to as the Common Internet File System (CIFS), uses an underlying NetBIOS protocol or a NetBIOS extended user interface (NETBEU) protocol. The NetBIOS protocol allows the applications in different devices to appropriately communicate with one another in a network environment.

Many data communication protocols that are still in use today, such as the SMB protocol, were developed at a time when computing resources were very different, e.g., network bandwidth was typically limited and memory was very precious. As a result, when used in contemporary networks, such protocols may limit overall performance. In particular, existing resource sharing services have limited functionality and are generally not extensible to allow the functionality of the file sharing service to be easily expanded by developers.

For example, SMB, as well as certain other resource sharing protocols, assume that a single user identity will be used for communication between an individual user and a particular remote host machine. This is a sensible approach for most situations, however it hampers scenarios that require simultaneous use of multiple user identities when accessing multiple shared resources on a single remote host.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

In order to allow a single user registered on a single local host or other machine to access multiple shared resources on a remote host, an aliasing mechanism is employed so that multiple concurrent connections can be established by the user to a single remote host, with each connection using a different identity. Each connection can therefore be used to access a different shared resource on the remote host.

In some illustrative examples, a user's identifier such as his or her machine log-in identification may be associated with two or more resource sharing aliases. As a result, two or more resource sharing sessions can be established by the user with a single remote host, with each of the sessions using a different one of the aliases. The resource sharing sessions are usually established in accordance with a resource sharing protocol such as the Server Block Message (SBM) protocol.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

This disclosure is directed to an extensible resource sharing service. Resource sharing enables a user of a remote host computer, server, or other computing device to designate some or all of the resources (e.g., files, printers) on the computing device as shared resources that may be accessed by other users of a network. Users of client computers, servers, or other computing devices may access the shared resources from the host via the network. In some instances, users or administrators may wish to expand or enhance an existing file sharing service or application to add additional functionality, such as the ability of a single user to access multiple shared resources on a single host computing device in a simple and efficient manner.

While the illustrative implementations that follow are often described in connection with the Windows™ Operating System offered by Microsoft Corporation, of Redmond, Wash., the extensible resource sharing techniques described herein are applicable to any file sharing system or environment.

Figure 1:
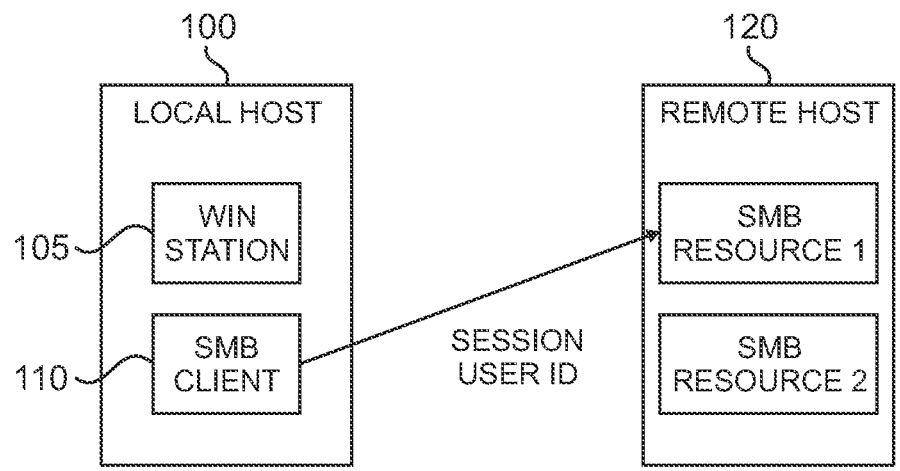
FIG. 1 shows one example of a computer networking environment in which a terminal service is established between a local host and a remote host.

FIG. 1 shows one example of computer networking environment in which a terminal service is established between a local host 100 and a remote host 120. For purposes of illustration local host 100 can share resources exposed by the remote host 120 using the SMB protocol. Of course, other resource sharing protocols may be used instead. The local host 100 includes an SMB client 110 for implementing SMB resource sharing and the remote host 120 exposes SMB resources such as SMB resource 1, SMB resource 2, SMB resource 3, and so on. While a terminal service is being depicted for purposes of illustration, other types of services may be offered by the remote host to the local host without loss of generality.

The local host 100 also includes a user WinStation 105 to facilitate implementation of the terminal service. The user Winstation 105 provides statistics concerning terminal service client sessions, including user name, domain name, IP address, session ID and connection status. Each WinStation 105 represents a single user who is logged in to a machine as an authorized user during a terminal services session. Multiple user WinStations may reside on the same local host.

One problem that arises when using certain protocols such as SMB for resource sharing is that they sometimes assume that a single user identity will be used for communication between a particular User WinStation and a particular remote host. For example, if a Windows™ user wants to access SMB resources (File Shares, Printer Shares, Inter-Process Communication or IPC Services) on a remote host, the SMB Client will establish a session with the remote host using a particular user identity. This is often convenient, since all subsequent resource requests to the remote host will not be required to repeat the necessary authentication steps and in this way access will be transparent to the user. However, this becomes problematic when trying to access multiple resources on the same remote host when access to each resource requires a different user identity. For instance, in FIG. 1 the SMB client 110 can establish a session with SMB shared resource 1 using one user identity, but may wish to also establish a session with SMB shared resource 2. In this case SMB cannot support the second session with SMB shared resource 2 since the user ID is already being used to access SMB shared resource 1.

For example, if a remote host exposes SMB File Shares "Share 1" and "Share 2", and permissions on these Shares are set in a mutually exclusive way (e.g. "User John can access Share 1 but cannot access Share 2, and user Alice can access Share 2 but cannot access Share 1"), there is no way for a user to access both Share 1 and Share 2 within the same WinStation even when the user knows both John and Alice's credentials.

In the case of the Windows operating system, Windows keeps track of this SMB identity on a per user (e.g., WinStation) basis so that multiple users of the same computer in a terminal services environment can use a different identity when accessing the same remote host. Within a single WinStation, however, the SMB protocol enforces the use of a single identity when accessing the same remote host. In other words, Windows cannot support more than one SMB connection from a single WinStation to the same remote host.

Figure 2:
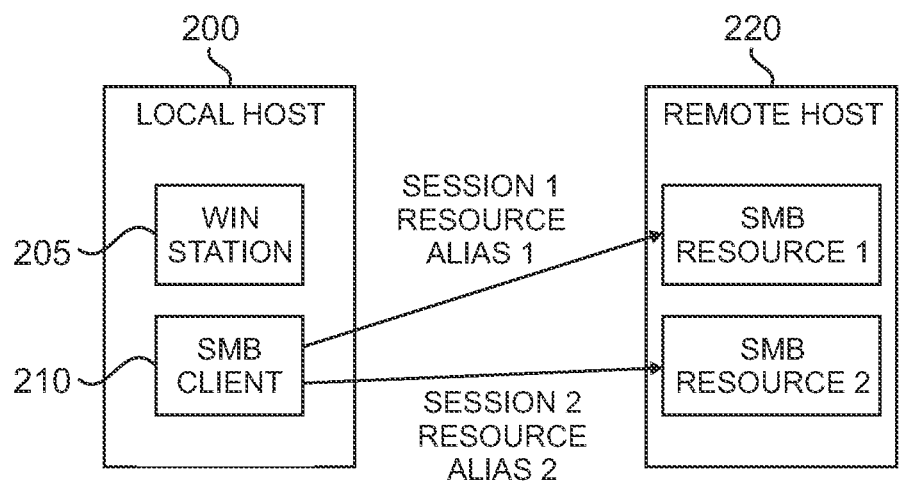
FIG. 2 shows a local host or client from which a user can access two or more shared resources residing on a single remote host using resource sharing aliases.

To overcome this limitation, an aliasing mechanism is employed so that multiple concurrent connections can be established from a single WinStation to a single remote host, with each connection using a different identity. That is, a single user who is logged in to a local host will be assigned a different resource sharing alias that allows the user to simultaneously access different shared resources on a single remote host. This is shown in FIG. 2 for a logged in user represented by WinStation 205. In this case the SMB client 210 associated with WinStation 205, which resides on local host 200, establishes a first session with SMB shared resource 1 on remote host 220 using resource alias 1 and a second session with SMB shared resource 2 using resource alias 2. In this way SMB can support two concurrent sessions with shared resources on the remote host 220.

Figure 3:
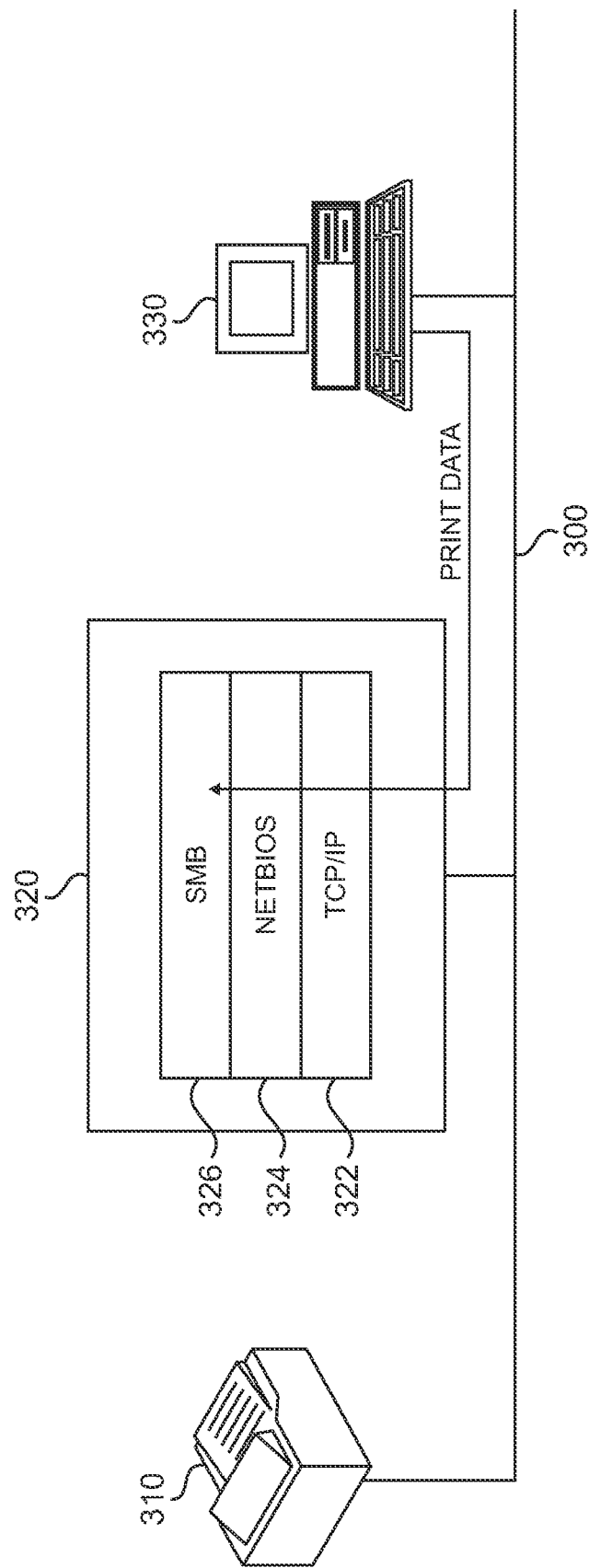
FIG. 3 shows one example of a protocol stack that may be used when a local host or client requests access to a shared resource using the Server Message Block (SMB) protocol.

FIG. 3 shows the protocol stack 320 that is used when local host or client 330 requests access to a shared resource using SMB, which in this example is a printer 310. The client 330 and printer 310 communicate over a network 300. If, for instance, the client 330 transmits print data, the data is transmitted using a TCP/IP protocol 322, a network basic input/output (NetBIOS) protocol 324, and an SMB protocol 326.

The NetBIOS protocol 324 allows the applications in different devices to appropriately communicate with one another in a network environment. That is, NetBIOS APIs allow applications on separate computers to communicate over a local area network. As shown, NetBIOS 324 typically runs over TCP/IP (NetBIOS over TCP/IP, or NBT), thus giving each computer in the network both a NetBIOS name and an IP address corresponding to a (possibly different) host name. NetBIOS 324 provides services related to the session layer of the OSI model.

In the present arrangement, when the SMB protocol is employed, the NetBIOS can assign the aliases to each user of the local host. In other words, each WinStation on the local host supports multiple aliases that have been assigned by the NetBIOS 324.

One example of an environment in which resource sharing aliases may be employed is a local area network that supports the Windows Live™ OneCare™ software package, which is a network management utility that manages multiple devices connected to one another over a local area network. Among other things, OneCare provides printer sharing support, wireless network security, and centralized backup for multiple PCs that are covered under a single OneCare subscription. Such a utility can be important in a small network environment, for instance, where administration of network computers is often performed by a person with a minimal amount of computer training, if any. For users to get the benefit of the network, which include shared resources as well as common login procedures on several different computers, many administration tasks may need to be presented in a simplified, easy to understand format. OneCare represents one arrangement for simplifying such administrative tasks.

In a OneCare environment, printers are shared among OneCare-enabled hosts using a special low-privilege "OneCare Printing" account, to reduce both security risks and exposure. However, if a printer is mapped (i.e. assigned a drive letter on the local host) using this low-privilege "OneCare Printing" account, it will affect the user's ability to use regular SMB file shares, as the identity used by SMB must be common for both file and printer shares. Thus it is not possible to map a printer using one account and map a network file share using a different account from the same client or local host, if both the printer and file shares are located on the same remote host. By using the name aliasing technique described herein for resource sharing, however, an alternate name (i.e. alias) can be provided for each host sharing a printer. Thus, the original name or identity of the host computer will remain available for other resource sharing tasks.

Figure 4:
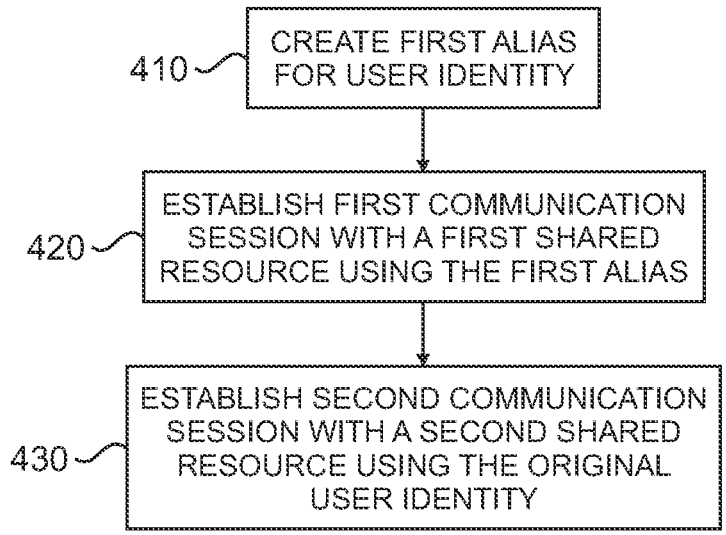
FIG. 4 is a flowchart showing one illustrative method by which a single user can access shared resources on a remote host using a resource sharing alias.

FIG. 4 is a flowchart showing one method by which a single user can access shared resources on a remote host. The method begins in step 410 when a first alias is created for a user identity. The first alias authorizes access to a first shared resource on the remote host. Next, in step 420, a first communication session is established with the first shared resource using the first alias. The first communication session may conform to a resource sharing protocol such as SMB, for example. Finally, in step 430, a second communication session is established by the user with a second shared resource on the remote host using the original user identity. The second communication session will typically conform to the same resource sharing protocol as the first communication session.

Figure 5:
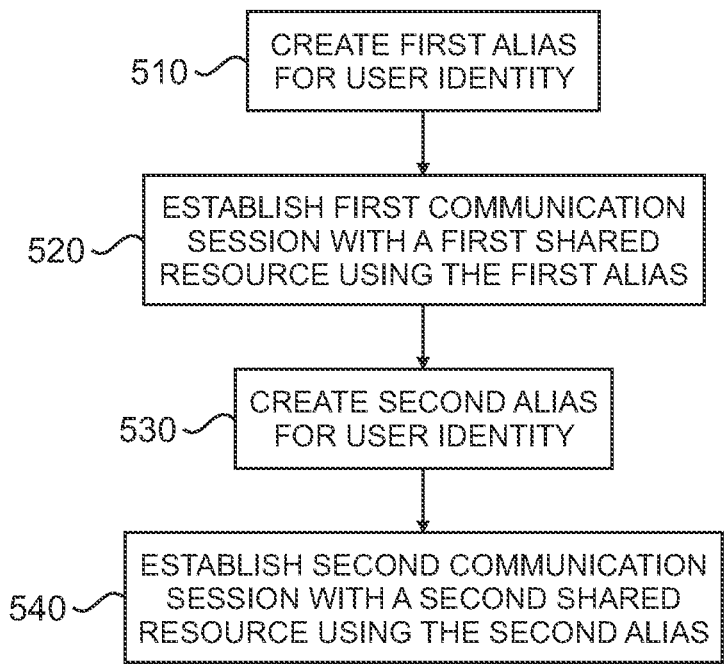
FIG. 5 is a flowchart showing another illustrative method by which a single user can access shared resources on a remote host using a resource sharing alias.

FIG. 5 is a flowchart showing another method by which a single user can access shared resources on a remote host. The method begins in step 510 when a first alias is created for a user identity. The first alias authorizes access to a first shared resource on the remote host. Next, in step 520, a first communication session is established with the first shared resource using the first alias. As before, the first communication session may conform to a resource sharing protocol such as SMB, for example. In step 530, a second alias is created for the same user identity. Finally, in step 540, a second communication session is established by the user with a second shared resource on the remote host using the second alias. Once again, the second communication session will typically conform to the same resource sharing protocol as the first communication session.

The invention claimed is:

1. A method for accessing shared resources on a remote host, comprising:
   creating for an original user identity representing a single user computing device a first alias for authorizing access to a first shared resource on a remote host, wherein the original user identity comprises the user's machine log-in identification, wherein the first alias is assigned by an aliasing mechanism;
   establishing a first communication session between the single user computing device and the first shared resource using the first alias; and
   establishing a second communication session between the single user computing device and a second shared resource on the remote host using the original user identity, comprising the user's machine log-in identification, representing the single user computing device,
   wherein said first communication session and said second communication session are concurrent.

2. The method of claim 1 further comprising:
   creating for the original user identity a second alias for authorizing access to a third shared resource on the remote host; and
   establishing a third concurrent communication session with the third shared resource using the second alias.

3. The method of claim 1 further comprising establishing the first and second communication sessions using a common resource sharing protocol.

4. The method of claim 3 in which the common resource protocol is a Server Message Block (SMB) protocol.

5. The method of claim 1 in which the original user identity allows a user to identify oneself to an operating system residing on a local host in order to obtain access thereto.

6. The method of claim 1 in which the remote host offers terminal services to the user and resource sharing is implemented as one of the terminal services.

7. The method of claim 1 wherein the computing device provides statistics concerning terminal service client sessions.

8. The method of claim 1 wherein the step of establishing a second communication session occurs after the step of establishing a first communication session.

9. The method of claim 1 wherein said first communication session and said second communication session conform to a common resource sharing protocol.

10. The method of claim 1 wherein the first alias is assigned by a network basic input/output (NetBIOS) protocol.

11. The method of claim 1 in which at least one of the first or second shared resources includes a shared printer.

12. The method of claim 1 wherein the computing device comprises a WinStation.

13. The method of claim 1 wherein the alias is assigned by a session level protocol.

* * * * *